United States Patent [19]

Melamed

[11] Patent Number: 4,597,377
[45] Date of Patent: Jul. 1, 1986

[54] SOLAR REFLECTOR SYSTEM

[76] Inventor: Alan M. Melamed, 1000 Grove St., Evanston, Ill. 60201

[21] Appl. No.: 658,754

[22] Filed: Oct. 9, 1984

[51] Int. Cl.$^4$ ................................................ F24J 2/10
[52] U.S. Cl. ..................................... 126/438; 126/424
[58] Field of Search ............... 126/424, 425, 438, 439, 126/451; 350/614, 628

[56] References Cited

U.S. PATENT DOCUMENTS

| | | | |
|---|---|---|---|
| 1,047,554 | 12/1912 | Nichols | 126/438 |
| 3,906,927 | 9/1975 | Caplan | 126/438 |
| 4,324,947 | 4/1982 | Dumbeck | 126/438 |
| 4,391,269 | 7/1983 | Watson | 126/438 |
| 4,483,324 | 11/1984 | Fromm | 126/425 |

FOREIGN PATENT DOCUMENTS 1238883  7/1960  France ................. 126/438

Primary Examiner—James C. Yeung
Attorney, Agent, or Firm—Allegretti, Newitt, Witcoff & McAndrews, Ltd.

[57] ABSTRACT

A solar reflector system for reflecting solar energy to an elongated solar receiving area disposed in an east-west or nearly east-west direction, and for helping to optimize the performance versus cost ratios of concentrating solar collector systems incorporating said reflector system. The solar reflector system comprises an elongated side reflector panel means to be hinged, at or near the appropriate edge of its reflector surface, about an axis that is parallel to and at or near a side of said solar receiving area. The reflector surface of said panel means is comprised of a plurality of flat planar relatively inexpensive reflector panels that are each elongated parallel to said solar receiving area for about the length of said solar receiving area, and that are assembled so as to comprise a curved (angulated) reflector surface. Adjacent flat planar reflector panels share a common edge that extends parallel to said solar receiving area and form an angle appropriate to facilitate efficient performance of the overall reflector panel means in reflecting solar energy to said solar receiving area. Means are provided for adjusting the curvature of the reflector surface by adjusting the angles formed by the adjacent flat planar reflector panels comprising the reflector surface. Also, a substantially flat planar reflector panel might, at appropriate times, be positioned vertically at either or both ends of said solar receiving area, to enhance reflector system performance.

14 Claims, 9 Drawing Figures

SOLAR REFLECTOR SYSTEM

BACKGROUND OF THE INVENTION

This invention relates to solar energy collecting devices and more particularly, to an improved solar reflector system for enhancing solar radiation applied to a solar receiving area in a simple mechanical fashion.

Solar energy collecting devices have been used for residential and commercial heating, but only on a rather limited basis. Continually curved reflector surfaces and solar tracking mechanisms that continually position a reflector relative to the collector's solar receiving area, to maximize performance of the collector are expensive and have not proven commercially practical. To use a fixed reflector results in rather inefficient operation of a concentrating collector over a year's time. Van Kuijk Pat. No. 4,396,008, for example, shows a solar heat collection device comprising collectors arranged to be fixedly disposed as sub-collectors each of a set of at least two of such collectors, with one longitudinal edge of their screen adjoining one another. Each sub-collector has a parabolic reflector screen for reflecting sun rays thereto.

Winston U.S. Pat. No. 4,387,961 discloses a compound parabolic concentrator with a V-shaped cavity having an optical receiver therein. The cavity redirects all energy entering between the receiver and the cavity structure onto the receiver, if the optical receiver is placed a distance from the cavity not greater than 0.27 r (where r is the radius of the receiver).

Way, Jr. U.S. Pat. No. 4,077,391 shows the use of entirely flat planar reflector panels hinged along the edges of a solar receiving area for the purpose of achieving temperatures suitable for cooking.

Wormser U.S. Pat. No. 4,329,978 relates to solar collectors of the type having associated, entirely planar reflectors to increase their efficiency and includes a method of establishing the orientation of the collector with respect to the sun such that the unit may be operated at a high level of year-round efficiency with only a semi-annual adjustment to the angular positioning of the reflector with respect to the collector.

This invention is concerned with solar collectors of such size that it is not practical to position them in an adjustable fashion. The solar collector is provided with a solar reflector system that comprises a plurality of flat planar reflector panels and that is hinged to provide a tracking operation so as to maximize solar collector performance.

An object of the present invention is to provide a fixed in-place solar collector with a hinged solar reflector system for enhancing the performance of the solar collector.

Another object of the present invention is to provide a relatively large fixed solar collector with an effective solar reflector system comprised of a plurality of flat planar reflector panels, which are less costly than smoothly curved reflector panels.

Yet another object of the present invention is to provide a solar reflector system for a large fixed solar collector, such reflector system comprising a relatively large flexible reflector surface that is seasonably adjustable insofar as curvature is concerned, by simply mechanical means to optimize reflectivity of solar energy to the solar receiving area of the collector.

Other objects and advantages of the present invention will be made more apparent hereinafter.

BRIEF DESCRIPTION OF THE DRAWING

This invention may be understood from the text and from the accompanying drawing in which like numerals in the various view indicate like elements and in which.

DETAILED DESCRIPTION OF THE PRESENT INVENTION

In the past, in-line, two-dimensionally concentrating solar collector systems have utilized either entirely flat planar reflector surfaces, which provide relatively limited feasible performance advantages, or they have utilized continually curved reflector panels, which tend to be expensive. Also, continually curved reflector panels often require solar tracking mechanisms that continually position the reflector panel or panels relative to the collector's solar receiving area, in precise manner, in order to achieve desirable reflector system efficiency.

I have invented a solar reflector system design for enhancing solar energy gain of solar collectors that have an elongated solar receiving area which is disposed in an east-west or nearly east-west direction, where said solar receiving area is of substantial width, in a presently preferred embodiment, at least about eight inches. The reflectors can greatly improve the year-round performance of such solar collector without need for a solar tracking mechanism.

The reflector surface is comprised of flat planar reflector panels, such as highly polished flat planar sheets of aluminum, which tend to be substantially less expensive than continually curved reflector panels. Each flat planar reflector panel comprising the reflector surface is at least about four inches wide and is elongated parallel to said solar receiving area of the collector for about the length of said solar receiving area. Adjacent flat planar reflector panels share a common edge that extends parallel to said solar receiving area for about the length of said solar receiving area, and form an angle appropriate to facilitate efficient performance of the overall reflector surface in reflecting solar energy to said solar receiving area.

The resulting reflector surface is hinged, at or near its appropriate edge, about an axis parallel to and at or near the north or south edge of said solar receiving area of the collector.

Because said reflector surface is comprised of not more than about six flat planar reflector panels, the physical structure supporting said reflector surface can be quite simple and consist primarily of flat, rectangular bars.

I have determined that it may be desirable to increase the angles between the flat planar reflector panels comprising such a reflector surface that is hinged along the north edge of a solar receiving area during winter months (thereby increasing the overall curvature of the reflector surface) and to decrease these angles during the summer months (thereby decreasing the overall curvature of the reflector surface).

Figure 1:
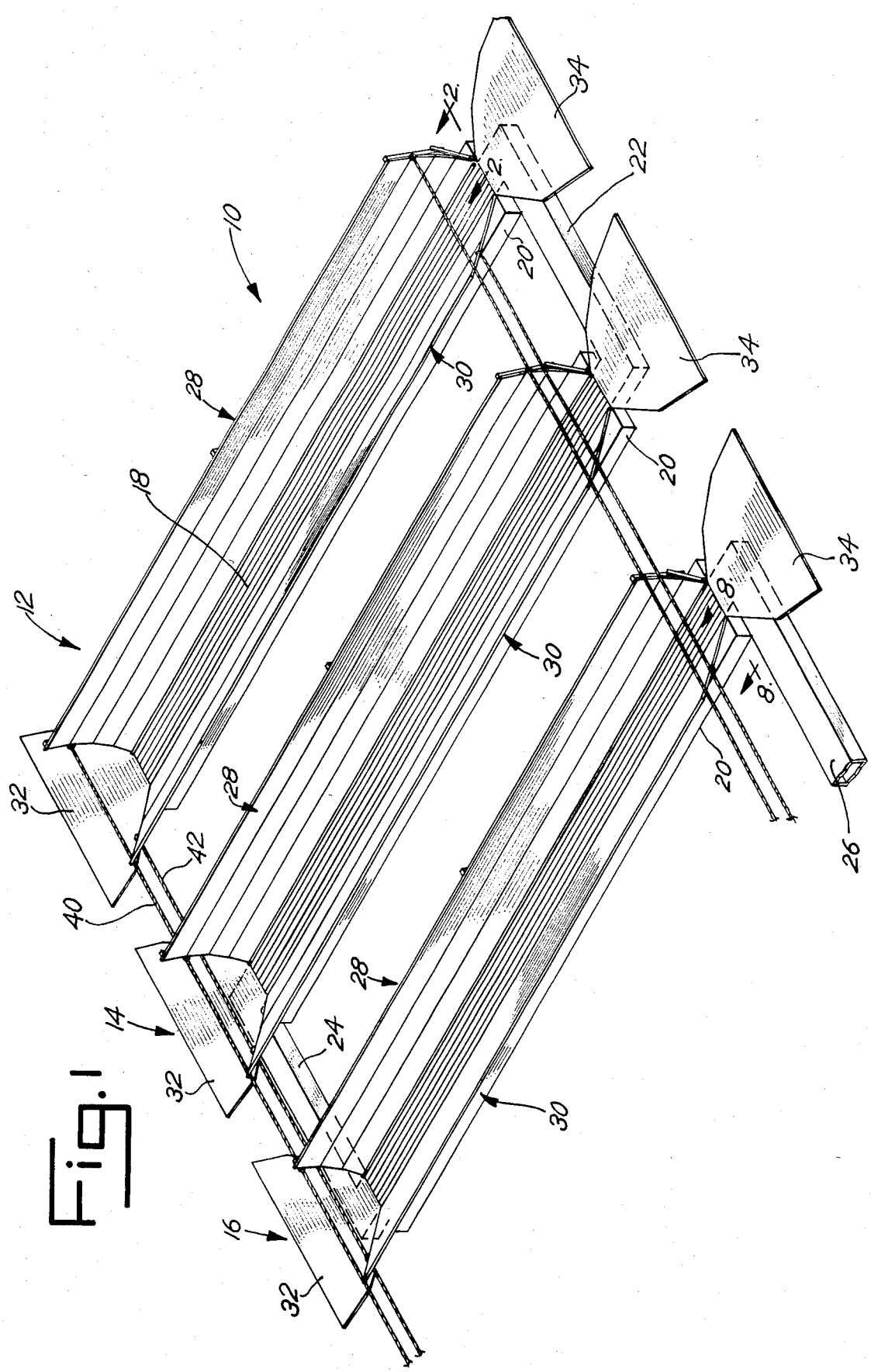
FIG. 1 is a schematic view of a solar collector assembly incorporating the novel reflector system design that comprises the present invention.

Turning to FIG. 1, there is shown a solar collector installation 10 utilizing the design concepts that comprise the present invention. The solar collector installation 10 may include more than one separate collector assemblies or units, for example three collector assemblies 12, 14 and 16 as shown. Each collector assembly is comprised of like or similar components and hence, solar collector assembly 12 will be described in more detail, it being understood that the corresponding elements may be embodied in the other two solar collector assemblies 14 and 16.

The solar collector assembly 12 comprises a solar collector panel or collector 20 with a solar receiving area 18 that is elongated along an east-west or nearly east-west axis. In a presently preferred embodiment of the present invention, the solar collector 20 is of flat-plate design with its solar receiving area approximately 20 to 40 feet in length by approximately 18 inches in width. Insulated piping 22 connects the solar collectors of units 12 and 14. Insulated piping 24 connects the solar collectors of units 14 and 16. Insulated piping 26 connects the solar collector installation 10 to a system.

The solar reflector system, which enhances the overall, year-round performance of the solar collector 20, comprises side panel means 28 and 30, and might also include end panel means 32 and 34, as shown. Each of the panel means 28, 30, 32 and 34 is suitably pivoted to the solar collector 20 or to a structural base near or adjacent to the solar collector 20. The panel means 28, 30, 32 and 34 are preferably fabricated from polished aluminum panels about 1/50 inch thick. In a presently preferred embodiment, the panel means 28 is about five feet high and the end panel means 32 and 34 are each about five feet high. The end panel means 32 and 34 are intended to be alternately raised and lowered. That is, during morning hours the panel means 32 would be raised to a vertical position and the panel means 34 would be lowered or positioned substantially horizontal to the ground. In the afternoon, the supplementary end panel mean 32 would be lowered to a substantially horizontal position relative to the ground and the panel means 34 would be raised to a vertical position. Whereas, the panel means 32 and 34 are each substantially planar, the panel means 28 and 30 each may be comprised of a plurality of flat planar reflector panels that are assembled to constitute a curved (angulated) reflector surface.

The panel means 30 of each of the solar collector assemblies 12, 14 and 16 are adapted to be interconnected by suitable means, for example, a cable 42. Similarly, the panel means 28 of each of the assemblies 12, 14 and 16 might be interconnected by a cable 40 for conjoint operation thereof. The cables 40 and 42 are connected to suitable controls for periodically adjusting the positions of reflector panel means 28, 30, dependent upon the position of the sun. The cables 40, 42 may be adjusted seasonally, several times a day, or continuously, if desired.

The panel means 28 is comprised of a compound mirror surface and/or surface of reflector material that is curved (angulated) in a unique fashion so as to simulate a compound mirror surface. Periodically, along the length of the reflector panel means 28, there may be secured a plurality of beams that may be adjusted relative to one another, as will be explained more fully hereinafter, to adjust one, some, or all of the angles formed by adjacent flat planar reflector panels comprising the overall reflector surface of panel means 28, and to thereby adjust the curvature (angulation) of said reflector surface so as to optimize its reflectivity of solar energy to solar receiving area 18.

Figure 2:
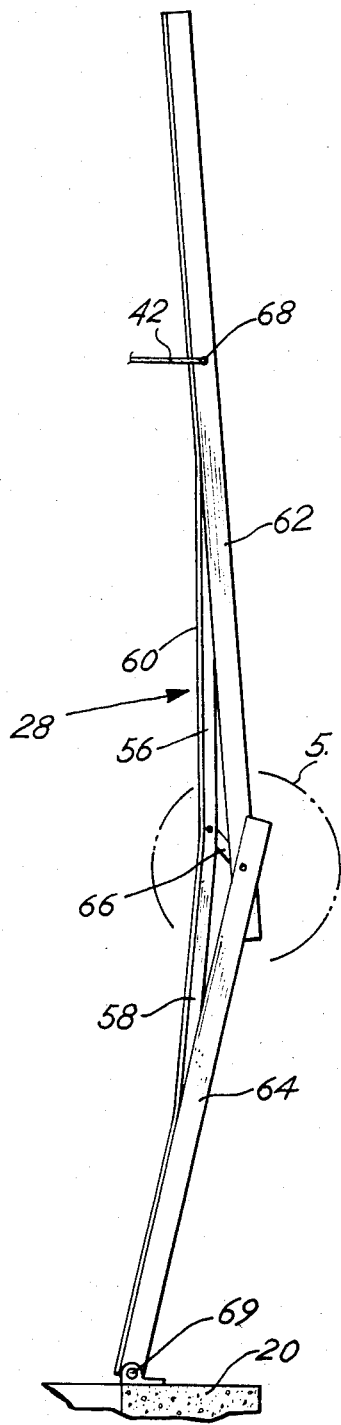
FIG. 2 is an end view of a reflector panel taken generally along the line 2—2 of FIG. 1 and illustrating reflector support beams of the panel in positions relative to one another such that the curvature angulation of the overall reflector surface of the panel is appropriate for summer operation.
Figure 3:
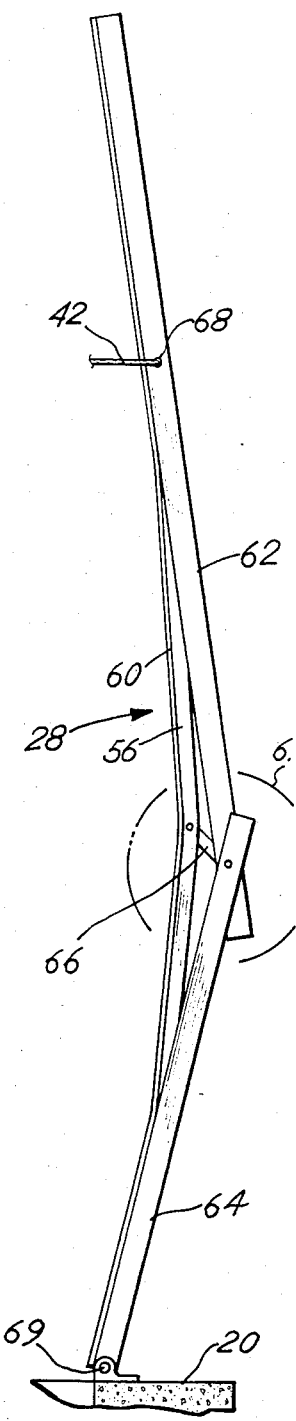
FIG. 3 is an end view similar to FIG. 2 illustrating the reflector support beams of FIG. 2 in position relative to one another appropriate for autumn and spring operation.
Figure 4:
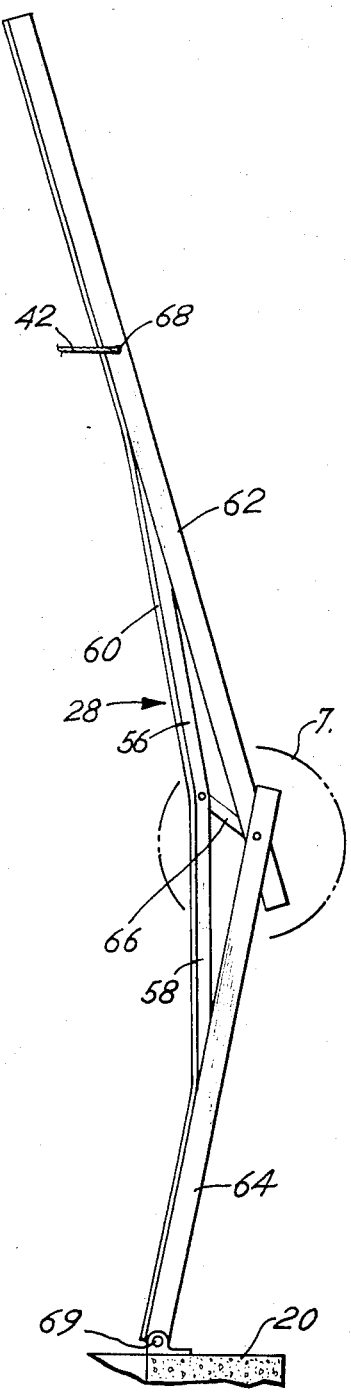
FIG. 4 is an end view similar to FIG. 2 illustrating the reflector support beams of FIG. 2 in positions relative to one another appropriate for winter operation.

FIGS. 2–4 illustrate the reflector panel means 28 as adjusted (insofar as curvature) to accommodate seasonal changes. The reflector panel means 28 includes a flexible reflector surface 60 comprised of a plurality of flat planar relfector panels. The reflective surface 60 may be affixed to a structural frame comprised of or partially comprised of a truss of beams (which recur periodically along the length of said panel means) such as the truss including beams 56, 58, 62, 64, and 66. The shape of said truss might be altered, on a seasonal basis, hence altering the curvature of reflector surface 60 by altering one, some, or all of the angles formed by adjacent flat planar reflector panels comprising reflector suface 60. Cable 40 may be suitably affixed to a position, for example, an opening 68 in beam 62 to affect adjustment of panel means 28 about pivot means 69 (which is at or near the north edge of solar receiving area 18). The pivot means 69 might be affixed to a structural base near or adjacent to the solar collector 20.

The relative adjustment of beams 56, 58 62, 64 and 66 will function to angulate the reflector surface 60 to optimize reflectivity of solar energy to the solar receiving area 18. The entire panel means 28 can be adjusted by cable 40 about pivot means 69 to further enhance desired positioning of reflector surface 60 relative to the receiving area 18 and to thereby increase solar gain to the solar collector 20. The angular rotation of the entire reflector panel means 28 about pivot means 69 can be adjusted as frequently as is practicable to adjust for changes in the sun's position.

Figure 5:
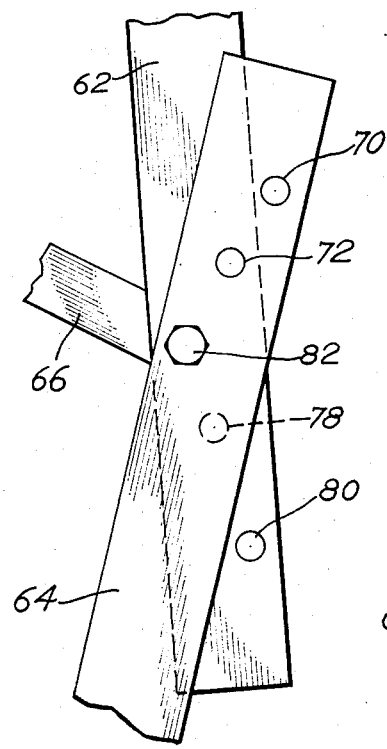
FIG. 5 is an enlarged detail view of the reflector support beams of FIG. 2 taken within the circle 5 of FIG. 2.
Figure 6:
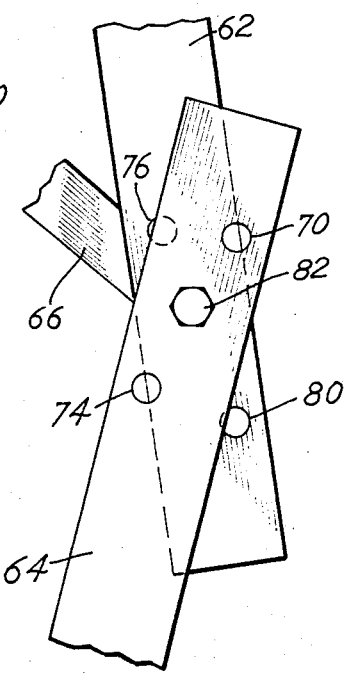
FIG. 6 is an enlarged detail view of the reflector support beams of FIG. 3 taken within the circle 6 of FIG. 3.
Figure 7:
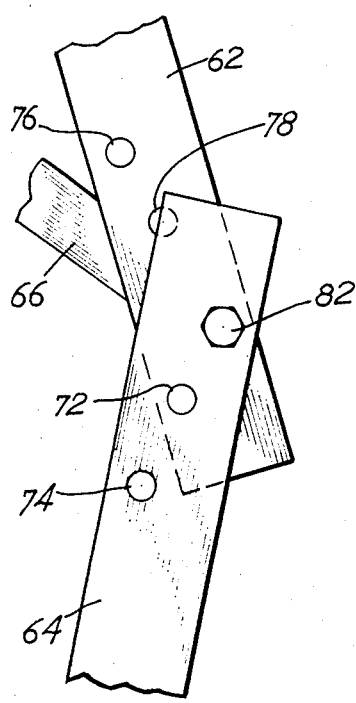
FIG. 7 is an enlarged detail view of the reflector support beams of FIG. 4 taken within the circle 7 of FIG. 4.

With reference to FIGS. 5, 6 and 7, there is shown further detail of the connection of beams 62, 64 and 66 to affect desired adjustment of the curvature of reflector surface 60. FIGS. 5, 6 and 7 are enlarged details of FIGS. 2, 3 and 4, respectively. Turning to FIG. 5, there is shown the summer positions relative to one another of the beams 62, 64 and 66. Where these three beams meet, each of the beams 62 and 64 is provided with three holes and beam 66 is provided with a single hole. Holes 70, 72 and 74 in beam 64 are winter, autumn and summer holes, respectively. Holes 76, 78 and 80 in beam 62 are summer, autumn and winter holes, respectively. Fastening means including bolt 82 will secure the beams 62, 64 and 66 in selected adjusted positions relative to one another. As seen in FIG. 5, bolt 82 passes through the aligned holes 74 and 76 in beams 64 and 62, respectively, to manifest summer curvature of the reflector surface 60.

Turning to FIG. 6, the bolt 82 is secured in aligned openings 72 and 78 in the beams 64 and 62, respectively, to manifest autumn curvature of the reflector surface 60. The same arrangement would be employed in the spring.

In FIG. 7, there is shown the arrangement of components for winter curvature of the reflector surface 60. Bolt 82 is passed through aligned openings 80 and 70 in the beams 62 and 64, respectively.

To effectuate the desired positioning relative to one another of beams 62, 64 and 66, beams 66 of different length are provided for the different seasons, or alternately, the beam 66 is provided with three holes where it meets beams 62 and 64, to accommodate seasonable adjustment.

Figure 8:
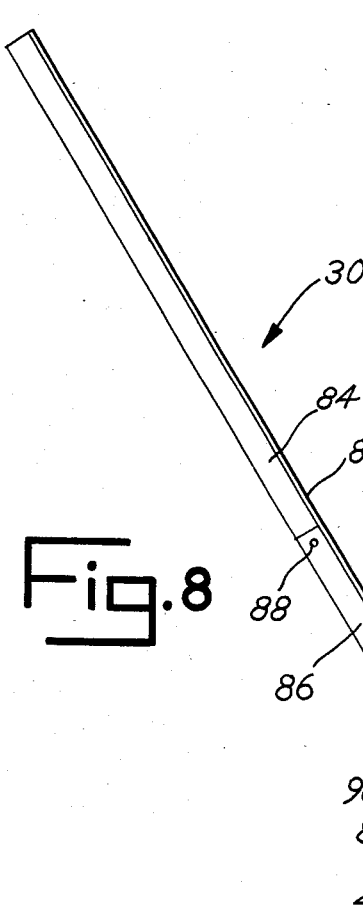
FIG. 8 is an end view of a reflector panel taken generally along the line 8—8 of FIG. 1.
Figure 9:
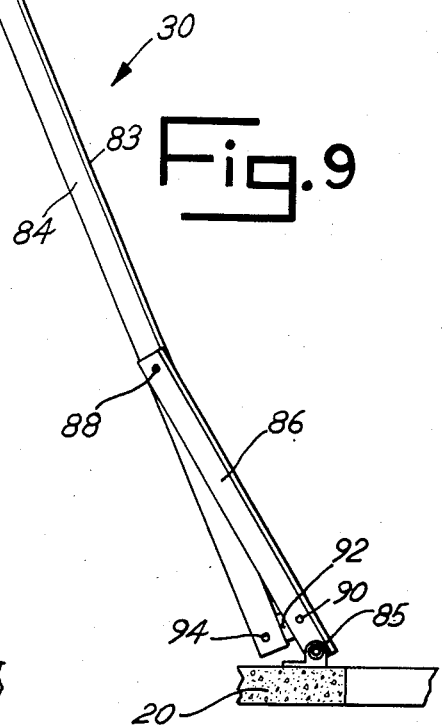
FIG. 9 is an end view of the reflector panel of FIG. 8, illustrating the reflector support beams of FIG. 8 in adjusted positions relative to one another, and the consequent adjusted shape of the overall reflector surface of the panel.

In FIGS. 8 and 9, there is shown a simpler form of reflector panel adjustment. The beams 84 and 86 are pivoted relative to one another about pivot 88. In FIG. 8, the beams 84 and 86 are secured together by bolt 90. Therefore, the reflector surface 83 functions as a flat planar surface about pivot means 85. In FIG. 9, the longer beam 84 and the shorter beam 86 are pivoted relative to one another about pivot 88 and beam 92 is secured between beams 84 and 86 so as to angulate the reflector surface 83. Beam 92 is secured to beam 84 by fastening means 94 and to beam 86 by fastening means 90.

If desired, the beam 66 may be secured between points on the beams 62 and 64 spaced above and below the pivotal connection of beams 62 and 64 to one another. Simply varying the combination of holes such as those shown in FIG. 5, used to connect the beams 62 and 64 will adjust the angle with respect to which beams 62 and 64 are retained with respect to one another and will adjust (insofar as curvature) the reflector surface 60 secured to the beams.

The truss shown in FIGS. 2, 3, and 4 is one example of a beam truss that might be used to comprise an extension of a structural frame supporting a reflector panel means hinged at or near the north or south edge of a solar receiving area, and/or to effectuate adjustment of one, some, or all of the angles formed by adjacent flat planar reflector panels comprising the reflector surface of said reflector panels. A presently preferred truss is comprised of nine beams and will support six flat planar reflector panels. This preferred truss allows for the simple adjustment of two of the angles formed by adjacent flat planar reflector panels supported by the truss. The manner of adjusting the shape of this truss and hence these two angles is essentially similar to the method described for adjusting the shape of the five beam truss delineated in the previous paragraph.

There has been provided by the present invention a unique reflector system design including reflector panel means that can be adjusted by simple mechanical means to concentrate solar energy onto a solar receiving area.

Though a presently preferred embodiment of the present invention has been shown and described, it will be understood that the invention is limited only by the scope of the appended claims.

What is claimed:

1. A solar reflector system for reflecting solar energy to an elongated solar receiving area disposed generally in an east-west direction and for helping to optimize the performance versus cost ratios of concentrating solar collector systems utilizing said solar reflector system, said solar reflector system comprising an elongated side reflector panel means to be hinged relative to said solar receiving area, hinge means adjacent the solar receiving area for pivotally connecting said reflector panel means relative to said solar receiving area, said reflector panel means including a reflector surface comprised of a plurality of flat planar reflector panels that are each elongated parallel to said solar receiving area for about the length of said solar receiving area, with adjacent flat planar reflector panels comprising said reflector surface sharing a common edge that extends parallel to said solar receiving area and forming an angle appropriate to facilitate efficient performance of the overall reflector panel means in reflecting solar energy to said solar receiving area, means for adjusting one, some, or all of the angles formed by adjacent flat planar reflector panels comprising the reflector surface, wherein the curvature of the overall reflector surface may be altered on a seasonal basis, and means for adjusting the entire reflector panel means relative to the solar receiving area about said hinge means, so as to improve year-round reflector panel means performance in reflecting solar energy to the solar receiving area.

2. A solar reflector system as in claim 1 including a structural frame supporting the reflector surface comprising a truss of beams and means for adjusting the shape of said truss so as to adjust one, some, or all of the angles formed by adjacent flat planar reflector panels comprising the reflector surface of said panel means and thereby adjust the curvature of the overall reflector surface of said panel means.

3. A solar reflector system as in claim 2 wherein beams of the truss each have fastening means serving as pivot means, for securing said beams together in a manner correlated to season, and thereby adjusting the curvature of the overall reflector surface of said panel means according to season so as to optimize reflection of solar energy to the solar receiving area.

4. A solar reflector system as in claim 1 wherein a side reflector panel means is hinged to each side of said solar receiving area.

5. A solar reflector system as in claim 1 including means for adjusting the curvature of the overall reflector surface of the side reflector panel means, said adjusting means comprising a first beam secured to the top portion of the reflector surface, a second beam secured to the bottom portion of the reflector surface and pivot means for pivoting the beams to one another.

6. A solar reflector system as in claim 5 wherein the beams and pivot means each have holes therein and fastening means for securing the pivot means and beams together in a manner correlated to season so as to optimize reflection of sunrays to the solar receiving area.

7. A solar reflector system as in claim 1 wherein each flat planar reflector panel is at least about four inches wide.

8. A solar reflector system as in claim 1 wherein the solar receiving area is a flat plate.

9. A solar reflector system for reflecting solar energy to an elongated solar receiving area disposed generally in an east-west direction and for helping to optimize the performance versus cost ratios of concentrating solar collector systems utilizing said solar reflector system, said solar reflector system comprising an elongated side reflector panel means to be hinged relative to said solar receiving area, said reflector panel means including a reflector surface comprised of a plurality of flat planar reflector panels that are each elongated parallel to said solar receiving area for about the length of said solar receiving area with adjacent flat planar reflector panels comprising said reflector surface sharing a common edge that extends parallel to said solar receiving area and forming an angle appropriate to facilitate efficient performance of the overall reflector panel means in reflecting solar energy to said solar receiving area, means for adjusting the curvature of the overall reflector surface of the side reflector panel means, said adjusting means comprising a first beam secured to the top portion of the reflector surface, a second beam secured to the bottom portion of the reflector surface and pivot means for pivoting the beams to one another, the beams and pivot means each have holes therein, and fastening means for securing the pivot means and beams together in a manner correlated to season so as to optimize reflection of sunrays to the solar receiving area, there being three holes in the first beam and three holes in the second beam, one of said holes in each beam being designated for summer operation, one of said holes in each beam designated for spring/fall operation, and one of said holes in each beam being designated for winter operation, the pivot means securing the first and second beams with the seasonally designated holes in aligned position.

10. A solar reflector system as in claim 9 including an additional, substantially flat planar reflector panel adapted to be positioned at one end of the solar receiving area, in a vertical plane that is normal to the direction of elongation of the solar receiving area, with its reflector surface oriented so as to enhance the performance of said solar reflector system.

11. A solar reflector system as in claim 10 including a second additional substantially flat planar reflector panel adapted to be positioned at the other end of the solar receiving area from said additional substantially flat planar reflector panel, in a vertical plane that is normal to the direction of elongation of the solar receiving area, with its reflector surface oriented so as to enhance the performance of the solar reflector system.

12. A solar reflector system as in claim 9 wherein the pivot means includes a third beam operatively connected at one end to the reflector surface and at the other end to the first and second beams.

13. A solar reflector system as in claim 12 wherein the pivot means includes a bolt which connects the third beam to the first and second beams.

14. A solar reflector system as in claim 13 wherein each flat reflector panel means is at least four inches wide.

* * * * *